United States Patent [19]
Henry et al.

[11] Patent Number: 5,822,607
[45] Date of Patent: Oct. 13, 1998

[54] METHOD FOR FAST VALIDATION CHECKING FOR CODE AND DATA SEGMENT DESCRIPTOR LOADS

[75] Inventors: G. Glenn Henry; Terry Parks, both of Austin, Tex.

[73] Assignee: Integrated Device Technology, Inc., Santa Clara, Calif.

[21] Appl. No.: 871,039

[22] Filed: Jun. 9, 1997

[51] Int. Cl.[6] ............................................. G06F 9/00
[52] U.S. Cl. .............................. 395/800.32; 711/208
[58] Field of Search ........................ 395/800.01, 800.32, 395/500, 670, 376, 651, 653, 701; 711/100, 200, 203, 208, 215

[56] References Cited

U.S. PATENT DOCUMENTS

| | | | |
|---|---|---|---|
| 4,602,328 | 7/1986 | Finger et al. ............................ | 711/206 |
| 5,144,551 | 9/1992 | Cepulis ................................... | 711/163 |
| 5,418,956 | 5/1995 | Willman ................................. | 395/682 |
| 5,517,651 | 5/1996 | Huck et al. ............................. | 395/570 |
| 5,564,030 | 10/1996 | Whitted, III et al. .................. | 711/201 |
| 5,577,219 | 11/1996 | Timko et al. ........................... | 711/201 |
| 5,596,735 | 1/1997 | Hervin et al. .......................... | 395/586 |
| 5,598,553 | 1/1997 | Richters et al. ........................ | 395/500 |
| 5,680,567 | 10/1997 | Dent ....................................... | 711/220 |

*Primary Examiner*—Alpesh M. Shah
*Attorney, Agent, or Firm*—James W. Huffman

[57] ABSTRACT

A method for improving the load time of code and data descriptors is provided. The invention utilizes hardware validation logic for code and data descriptors, but uses a software program to validate system descriptors. In those instances where the descriptor being loaded is a code or data descriptor, system validation checks are not performed. This allows code and data descriptors to be validated and stored into a segment register much faster than if system validation checks were also performed. If the descriptor is found invalid by the hardware validation logic, a branch is made to a software program which is used to determine whether the descriptor is invalid, or is actually a system descriptor. If it is a system descriptor, then system descriptor validation checks are performed by a software program.

34 Claims, 7 Drawing Sheets

FIG. 3 (Prior Art)

DATA SEGMENT DESCRIPTOR

| 31 30 29 28 27 26 25 24 | 23 | 22 | 21 | 20 | 19 18 17 16 | 15 | 14 13 | 12 | 11 10 9 8 | 7 6 5 4 3 2 1 0 |
|---|---|---|---|---|---|---|---|---|---|---|
| BASE 31:24 | G | B | 0 | AVL | SEG LIMIT 19:16 | P | DPL | 1 | 0 E W A / TYPE | BASE 23:16 |
| BASE ADDRESS 15:00 | | | | | | SEGMENT LIMIT 15:00 | | | | |
| 31 30 29 28 27 26 25 24 23 22 21 20 19 18 17 16 | | | | | | 15 14 13 12 11 10 9 8 7 6 5 4 3 2 1 0 | | | | |

CODE SEGMENT DESCRIPTOR

| 31 30 29 28 27 26 25 24 | 23 | 22 | 21 | 20 | 19 18 17 16 | 15 | 14 13 | 12 | 11 10 9 8 | 7 6 5 4 3 2 1 0 |
|---|---|---|---|---|---|---|---|---|---|---|
| BASE 31:24 | G | D | 0 | AVL | SEG LIMIT 19:16 | P | DPL | 1 | 1 C R A / TYPE | BASE 23:16 |
| BASE ADDRESS 15:00 | | | | | | SEGMENT LIMIT 15:00 | | | | |
| 31 30 29 28 27 26 25 24 23 22 21 20 19 18 17 16 | | | | | | 15 14 13 12 11 10 9 8 7 6 5 4 3 2 1 0 | | | | |

SYSTEM SEGMENT DESCRIPTOR

| 31 30 29 28 27 26 25 24 | 23 | 22 | 21 | 20 | 19 18 17 16 | 15 | 14 13 | 12 | 11 10 9 8 | 7 6 5 4 3 2 1 0 |
|---|---|---|---|---|---|---|---|---|---|---|
| BASE 31:24 | G | | 0 | | SEG LIMIT 19:16 | 1 | DPL | 0 | TYPE | BASE 23:16 |
| BASE ADDRESS 15:00 | | | | | | SEGMENT LIMIT 15:00 | | | | |
| 31 30 29 28 27 26 25 24 23 22 21 20 19 18 17 16 | | | | | | 15 14 13 12 11 10 9 8 7 6 5 4 3 2 1 0 | | | | |

32-BIT CALL GATE

| 31 30 29 28 27 26 25 24 23 22 21 20 19 18 17 16 | 15 | 14 13 | 12 | 11 10 9 8 | 7 6 5 | 4 3 2 1 0 |
|---|---|---|---|---|---|---|
| OFFSET IN SEGMENT 31:16 | P | DPL | 0 | 1 1 0 0 | 0 0 0 | DWORD COUNT |
| SEGMENT SELECTOR | | | | OFFSET IN SEGMENT 15:00 | | |
| 31 30 29 28 27 26 25 24 23 22 21 20 19 18 17 16 | | | | 15 14 13 12 11 10 9 8 7 6 5 4 3 2 1 0 | | |

AVL    AVAILABLE FOR USE BY SYSTEM SOFTWARE
BASE    SEGMENT BASE ADDRESS
D/B    DEFAULT OPERATION SIZE
       (0 = 16-BIT SEGMENT; 1 = 32-BIT SEGMENT)
DPL    DESCRIPTOR PRIVILEGE LEVEL
G    GRANULARITY
LIMIT    SEGMENT LIMIT
P    SEGMENT PRESENT
S    DESCRIPTOR TYPE (0 = SYSTEM; 1 = APPLICATION)
TYPE    SEGMENT TYPE
▓    RESERVED

FIG. 4

| TYPE | DEFINES |
|---|---|
| 0 | Read-only |
| 1 | Read-only, accessed |
| 2 | Read/write |
| 3 | Read/write, accessed |
| 4 | Read-only, expand-down limit |
| 5 | Read-only, expand-down limit, accessed |
| 6 | Read/write, expand-down limit |
| 7 | Read/write, expand-down limit, accessed |
| 8 | Execute-only |
| 9 | Execute-only, accessed |
| A | Execute/read |
| B | Execute/read, accessed |
| C | Execute-only, conforming |
| D | Execute-only, conforming, accessed |
| E | Execute/read, conforming |
| F | Execute/read, conforming, accessed |

FIG. 5

| TYPE | DEFINES |
|---|---|
| 0 | Reserved |
| 1 | Available 16-bit TSS |
| 2 | LDT |
| 3 | Busy 16-bit TSS |
| 4 | 16-bit Call Gate |
| 5 | Task Gate |
| 6 | 16-bit Interrupt Gate |
| 7 | 16-bit Trap Gate |
| 8 | Reserved |
| 9 | Available 32-bit TSS |
| A | Reserved |
| B | Busy 32-bit TSS |
| C | 32-bit Call Gate |
| D | Reserved |
| E | 32-bit Interrupt Gate |
| F | 32-bit Trap Gate |

METHOD FOR FAST VALIDATION CHECKING FOR CODE AND DATA SEGMENT DESCRIPTOR LOADS

CROSS REFERENCE TO RELATED APPLICATIONS

This application is related to copending U.S. application Ser. No. 08/912,264, filed on Aug. 8, 1997, entitled "APPARATUS AND METHOD FOR ON THE FLY DESCRIPTOR VALIDATION" to Glenn Henry, Terry Parks.

BACKGROUND OF THE INVENTION

1. Field of the Invention

This invention relates in general to the field of memory segmentation, and more particularly to an improved method for loading code and data segment descriptors.

2. Description of the Related Art

Memory management is a hardware mechanism which lets operating systems create simplified environments for running programs. For example, when several programs are running at the same time, they must each be given an independent address space. If they all had to share the same address space, each would have to perform difficult and time consuming checks to avoid interfering with the others.

Memory management consists of two methodologies called segmentation and paging. Segmentation is used to give each program several independent, protected address spaces. Paging is used to support an environment where large address spaces are simulated using a small amount of RAM and some disk storage. When several programs are running at the same time, either mechanism can be used to protect programs against interference from other programs. The present discussion will focus primarily on segmentation.

Segmentation organizes memory into a collection of variable-size units, called segments. Within x86 processors, a two-part address is utilized to calculate a linear memory address: a segment part and an offset part. The first part of the address, the segment part, defines a base address for a memory segment, and is stored in a segment descriptor within a segment register. The offset defines a particular memory location which is offset from the base address. For a general background on segmentation in x86 processors, please see U.S. Pat. No. 4,442,484 issued to Childs, Jr. et al.

Referring to FIG. 1, a block diagram 100 of a prior art multi-segmented memory is shown. The block diagram 100 includes segment registers 102 which contain segment descriptors 104. The segment registers 102 are located within a register file of a microprocessor, not shown. The segment descriptors 104 define the base address of a segment in a memory 106, the size or limit of the segment, and various access and protection privilege attributes of the memory segment. Reference to a memory location is then specified by referring to a particular segment register 102, and by providing an offset. Once the base address of a segment is known, a specific location can be determined by a relative offset from this base location.

To access data within a given memory segment, a program first loads a segment register 102 with a special value that identifies that segment. This special value is called a selector. Programs then reference memory by specifying, either implicitly, explicitly, or by default, the segment register 102 containing the selector for the segment part of the address, and by providing an offset from the base address.

More specifically, the selector is used to index into a one of a number of descriptor tables which contain, descriptors. Descriptors define a base address for each segment, the largest offset than can be used with the segment (the limit), and various attributes of the segment such as whether the segment can be read from, written to, or executed as a program, the privilege level of the segment, and whether the segment has been previously accessed. The descriptor tables are stored in memory.

When access to a particular memory segment is desired, a program must first load a selector which identifies the segment into a segment register. Commensurate with the loading of the selector, the descriptor which defines the segment is loaded into a hidden or shadow register termed the descriptor register, which is associated with the segment register. Future references to the segment can then utilize the base address, limit, and attributes of the segment by retrieving the descriptor directly from the segment register (an on-chip access which is fast), without requiring access to one of the descriptor tables in memory (an off-chip slow process).

It is known to utilize different types of descriptors depending on what type of memory segment is to be accessed. For example, memory segments are often classified as either code, data or system. Associated with each of these memory segment types are corresponding code, data or system descriptors, by which the memory segments are defined and accessed.

When loading a segment register with a selector, and its associated descriptor, the selector is first loaded into a temporary register. Several tests are performed on the selector to insure that it is valid, i.e., that it actually references a descriptor. If the selector is valid, the descriptor corresponding to the selector is retrieved and placed into a temporary register.

Tests are then performed on the descriptor to determine whether the descriptor is valid, prior to the descriptor being stored in the descriptor register. Only after the selector and descriptor have been validated and stored can they be used to reference a memory segment. However, since the base address, limit and privilege level information is now resident in the segment register, subsequent protection checks on the same segment can be performed without a performance penalty. A more thorough discussion of descriptor validity tests is provided below in the Detailed Description.

Checking of the selector/descriptor to determine whether they are valid is very time consuming for the processor. Such checking, albeit necessary, adds further delay to the selector/descriptor load operation, and therefore to the time required before the desired memory segment can be accessed. If the type of memory segment which is being referenced is a code or data segment, one set of validity tests are performed on the descriptor. If the type of memory segment which is being referenced is a system segment, a different, more time consuming set of validity tests are performed.

In the prior art, to allow access to a memory segment to occur as fast as possible, validation of segment descriptors was performed in hardware, typically using a programmed logic array (PLA) within a processor. The contents of the temporary register which held the descriptor would be provided to descriptor validation logic. The descriptor validation logic would then indicate whether the descriptor was valid, thereby allowing the selector/descriptor to be stored within a segment register, or indicate the descriptor was invalid, thereby preventing the selector/descriptor from being stored in the segment register.

However, as was mentioned above, the validation tests which are necessary varies depending on whether a descriptor references a code, data or system type memory segment. Therefore, to validate descriptors as fast as possible, at least two sets of descriptor validation logic have been included within processors. A code/data descriptor validation logic was provided to validate code and data segments. A system descriptor validation logic was provided to validate system segments. The code/data logic was placed in parallel with the system logic so that validation of a descriptor would occur in parallel, whether the descriptor referenced a code, data or system memory segment.

Several problems result from providing different validation logic for different descriptor types. First, each validation logic PLA requires valuable transistor real estate space on a microprocessor. And, increased transistor space adds to the cost and power requirements of a microprocessor.

Second, it is believed that prior art microprocessors contain both the code/data validation logic, and the system validation logic, to complete verification of a descriptor before it can be stored within a segment register. Since system descriptor validation is more complex, and thus more time consuming to perform, descriptors which reference code/data memory segments are not stored into a segment register until after system descriptor validation has been performed. This adds further delay to the descriptor load process.

What is needed is a method for loading a segment register which minimizes delays typically associated with performing system descriptor validation during code or data descriptor loads. More specifically, what is needed is a method which eliminates processing delays associated with validating system descriptors when the descriptor being loaded corresponds to either a data or code segment.

In addition, what is needed is a method for validating code/data descriptors, and system descriptors, but which requires only one descriptor validation logic circuit, thereby reducing transistor real estate cost within a microprocessor.

SUMMARY

To address the above-detailed deficiencies, it is an object of the present invention to provide a method for improving the speed at which code and data descriptors are loaded.

It is another object of the present invention to improve the availability of code and data memory segments when corresponding descriptors need to be loaded into segment registers.

It is a further object of the present invention to reduce the hardware typically required to validate descriptors.

It is yet another object of the present invention to provide validation for system descriptors in software.

Accordingly, in the attainment of the aforementioned objects, it is a feature of the present invention to provide a method for optimized loading of a segment register within a processor. The method includes several steps. The first step is to load a selector. The next step is to load a descriptor which corresponds to the selector. A third step is to perform segment validation checks on the descriptor utilizing a hardware validation circuit. A fourth step stores the descriptor and corresponding selector into the segment register, but only if the hardware validation circuit determines that the descriptor is valid. If the descriptor is a system descriptor, the method will branch to a software program that validates system descriptors. If the software program determines that the descriptor is a valid system segment, the method will store the descriptor in the segment register within the processor.

In another aspect, a feature of the present invention is to provide a method for loading a segment register within a processor, where the processor uses hardware validation for code and data segments, and software validation for system segments. The method includes the following steps. First, a selector is retrieved, either from another register, or from memory, and stored into a temporary register. Validation checks are then performed on the selector. If the selector is valid, the method retrieves a descriptor corresponding to the selector and stores the descriptor into a temporary register. The descriptor is then provided to a hardware validation circuit. If the hardware validation circuit indicates that the stored descriptor is valid, the method stores the selector and descriptor into the segment register. If the hardware validation circuit indicates that the stored descriptor is not valid, either because the descriptor is invalid, or because it is a system segment, the method branches to a software program which validates system descriptors. If the software program determines that the stored descriptor is a valid system descriptor, the method stores the selector and descriptor into the segment register.

An advantage of the present invention is that time consuming system descriptor checks are not performed unless the hardware validation logic determines that the descriptor being loaded is not a valid code or data descriptor.

Another advantage of the present invention is that code and data descriptors may be stored into a segment register, and thus made accessible to a processor, much faster than if system validation checks were also performed on the code and data descriptors.

In yet another aspect, it is a feature of the present invention to provide a method for loading a segment register, within a processor which has hardware validation checks for code and data descriptors, and software validation checks for system descriptors. The method includes the following steps. The first step retrieves the selector. The next step validates the selector. If the selector is valid, the method then retrieves a descriptor which corresponds to the selector. After retrieving the descriptor, it is provided to a hardware validation circuit which validates code and data descriptors. If the hardware validation circuit determines that the descriptor is a valid code or data descriptor, the selector and descriptor are stored into the segment register. If the hardware validation circuit determines that the descriptor is not a valid code or data descriptor, the method branches to a software program which validates system descriptors. If the software program determines that the descriptor is a valid system descriptor, the selector and descriptor are stored into the segment register. When the hardware validation circuit performs a check on the descriptor, it does not perform validation checks which are applicable only to system descriptors.

BRIEF DESCRIPTION OF THE DRAWINGS

These and other objects, features, and advantages of the present invention will become better understood with regard to the following description, and accompanying drawings where:

FIG. 3 is a block diagram of data, code and system segment descriptors, and a 32-bit call gate.

FIG. 4 is a table defining the segment types for data and code descriptors.

FIG. 5 is a table defining the segment types for system descriptors.

DETAILED DESCRIPTION

As mentioned above, before data in a memory segment can be accessed by a program, the segment must be made addressable by loading the selector/descriptor for the segment into a segment register. A general description of how a segment register is loaded, including how the segment descriptor is loaded into the associated shadow descriptor register will be provided below with reference to FIG. 2.

As an overview, when a selector is loaded, it is first checked for validity. If these checks fail, an exception is raised and the segment register is not modified. If the selector is valid and not null, the corresponding descriptor is retrieved from the memory resident segment descriptor table, and another set of checks is applied. If these checks fail, an exception is raised and the segment register is not modified. If the descriptor checks pass, an access bit in the descriptor is set, the descriptor is written back into the descriptor table, and the descriptor is stored into the corresponding shadow registers. Then, when the segment register is specified in an address, the descriptor is available on-chip in special registers for efficient processing.

Figure 1:
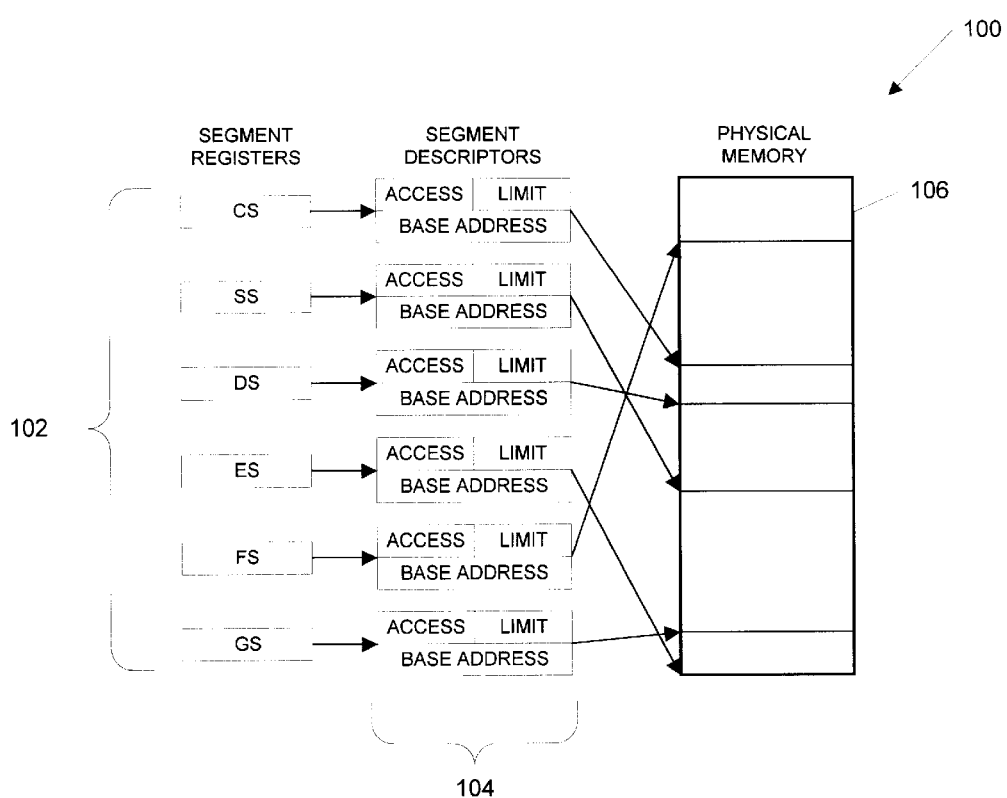
FIG. 1 is a block diagram of a prior art multi-segment memory model.
Figure 2:
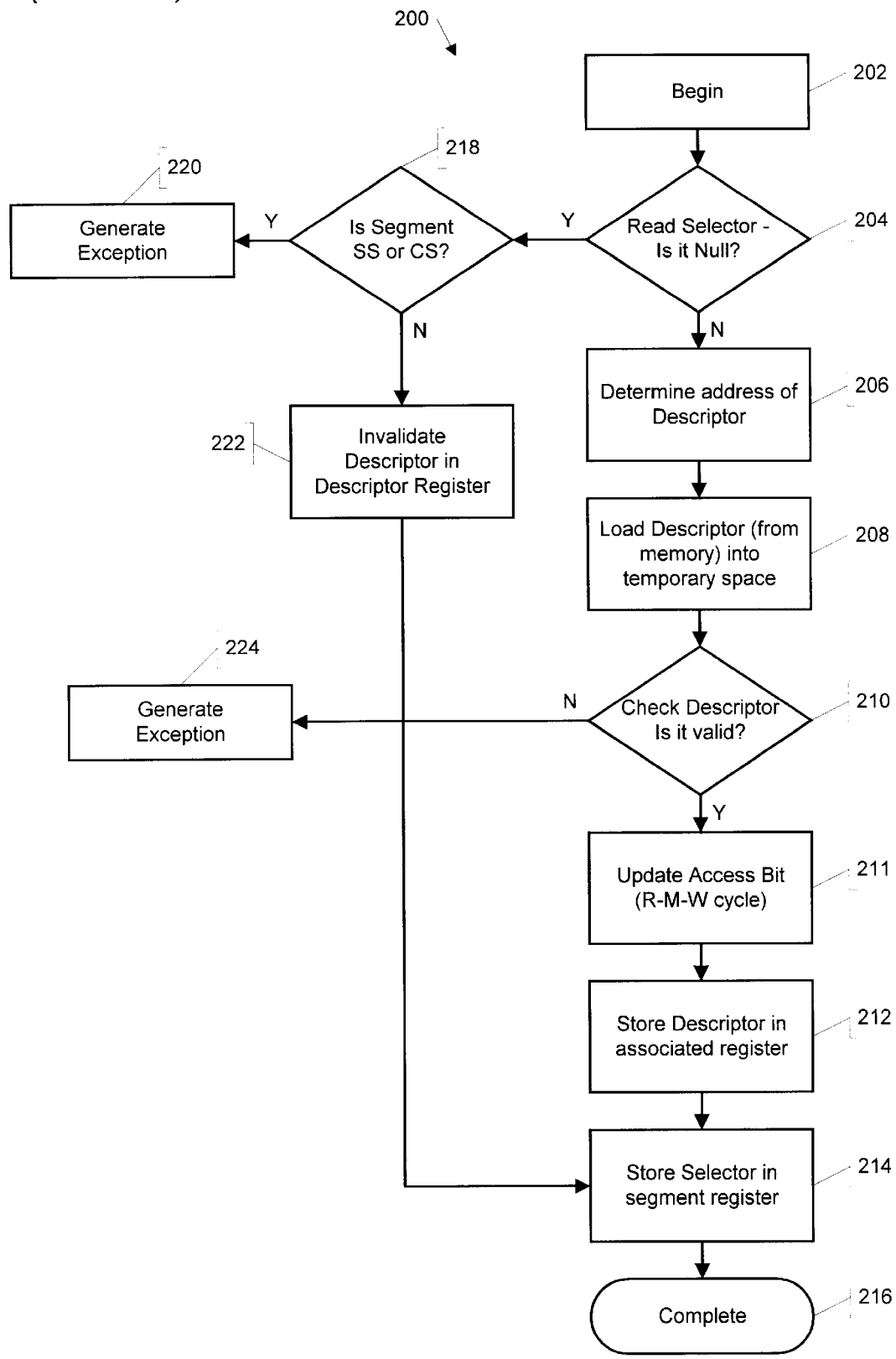
FIG. 2 is a flow chart illustrating a prior art method for loading a descriptor.

Referring to FIG. 2, a flowchart 200 is shown which illustrates a method for loading a segment register. Program flow begins at step 202. At step 204, a selector is read, either from memory, or from a general purpose register within a register file. The selector is placed within a temporary register, both for testing, and to prevent the destination segment register from being overwritten prior to complete validation of the new memory segment. The selector is tested to determine whether it is null.

One skilled in the art should appreciate that a null selector is a selector having a value of three or less, which is used to determine whether any subsequent memory reference uses the segment. A null selector is only valid for loading into the DS, ES, FS, and GS registers, but not SS or CS. If the selector is null, instruction flow proceeds to step 218.

At step 218, the processor determines whether the selector is being loaded into either the stack segment register (SS) or the code segment register (CS). If it is, the processor proceeds to block 220 and generates an exception.

If the null selector is to be loaded into one of the other segment registers, the processor, at block 222, invalidates the hidden descriptor in the descriptor register by setting the P bit to 0 in the segment attributes field in the shadow descriptor register to indicate an invalid descriptor. Then any subsequent memory reference that uses the segment register will raise an exception. The processor then proceeds to block 214 and writes the selector into the segment register.

If at block 204 the processor determines, that the selector is not null, the processor proceeds to block 206. At block 206 the processor determines the address of the descriptor. This involves extracting the TI bit from the selector to determine which descriptor table applies, GDT or LDT, and utilizing the descriptor index to determine the location within the descriptor table of the desired descriptor. The processor then proceeds to block 208.

At block 208, the processor has calculated the address of the descriptor using the descriptor index in the selector, and the base address of the descriptor table, stored in either the GDTR or the LDTR. The processor then loads the descriptor into a temporary (invisible) memory space within the processor. The processor then proceeds to block 210.

At block 210, the processor checks the descriptor to determine whether it is valid. Descriptor load validity checking assures that the selected descriptor corresponds to a segment which may lawfully be accessed via the segment register type and is accessible from the current privilege level.

As was mentioned in the Background, the type of validity checks which are performed on a descriptor depend on whether the descriptor corresponds to code or data segments, or special system segments or gates. System segments or gates are used for managing tasks, exceptions and interrupts. And, in the case of gates, the descriptors hold pointers to procedure entry points rather than defining segments.

If the descriptor refers to a code or data segment, the descriptor can be found invalid for a number of reasons. First, a privilege level test is performed to ensure that the requesting program has sufficient privilege to access the desired segment. Second, a segment with execute/read access can be loaded into the DS, ES, FS, or GS registers, but not SS. Third, a type field within the descriptor is checked to ensure that it is appropriate for the designated segment register. For example, a load into the SS register requires that the segment be typed as a read/write segment. Loads into the CS register require that the segment be typed as execute or execute/read. Loads into the other segment registers only require that the segment be readable.

Failure of any of these tests will result in an immediate protection violation exception, illustrated by block 224. If the descriptor passes the checks, the processor proceeds to block 211.

At block 211, the processor performs a test on the descriptor to determine whether the access bit in the descriptor has been set. The processor performs a modify on the descriptor, to set the access bit==1, and writes the updated descriptor back into the descriptor table. The descriptor may then be tested by a later program to determine whether access to the memory segment has been attempted. Program flow then proceeds to block 212. Note: updating the Access bit in the middle of a descriptor load routine is very time consuming for the processor. An improved method for updating the Access bit during a descriptor load is described in co-pending U.S. patent application No. (Docket - IDT:1238) entitled "METHOD FOR IMPROVED UPDATING OF DESCRIPTOR ACCESS BIT", to Glenn Henry and Terry Parks.

At block 212, the processor stores the descriptor into the hidden descriptor register associated with the selector segment. The processor then proceeds to block 214.

By the time the processor reaches block 214, the descriptor has been determined, checked, and stored into the hidden register associated with the selector segment. The processor now stores the selector in the segment register. The segment selector/descriptor is now ready to be referenced by another instruction in a program. The process is complete as shown by block 216.

As mentioned above, the validity tests which are performed on a descriptor depend on the type of descriptor, whether code, data or system. Referring to FIG. 3, a diagram 300 is shown which illustrates descriptor formats for code, data, system and gate descriptors. The code and data descriptor formats are essentially the same, distinguished primarily by bit 11 of the upper word, which if set, indicates that the descriptor type is a form of execute. For a list of code and data descriptor types, please refer to FIG. 4.

The format for a system descriptor is similar to that of the code and data descriptors, except that bit 12 of the upper word is cleared to indicate that the descriptor is a system descriptor. In addition, the Type field (bits 8–11 of the upper word) are defined differently. For a list of system descriptor types, please refer to FIG. 5.

The format for a gate descriptor is very different from that of code and data descriptors. In x86 processors, there are four kinds of gate descriptors: Call gates; Trap gates; Interrupt gates; and Task gates. Task gates are used for task switching. Trap and Interrupt gates are used for exceptions and interrupts. And, Call gates are used to control transfers between different privilege levels. The selector and offset fields of a gate form a pointer to an entry point of a procedure. A call gate guarantees that all control transfers to other segments go to a valid entry point. Rather than the providing a selector and an offset as operands, the segment selector for a call gate points to a gate descriptor, and the offset is not used, because the offset is stored within bits 31:16 of the upper word of the gate descriptor.

The above discussion with reference to FIGS. 3–5 is intended to illustrate the differences between code/data descriptors, and system descriptors (including gates). One skilled in the art well appreciates that the differences in the descriptor types requires validity checking during a load that is particular to the type of descriptor which is being loaded.

Figure 6:
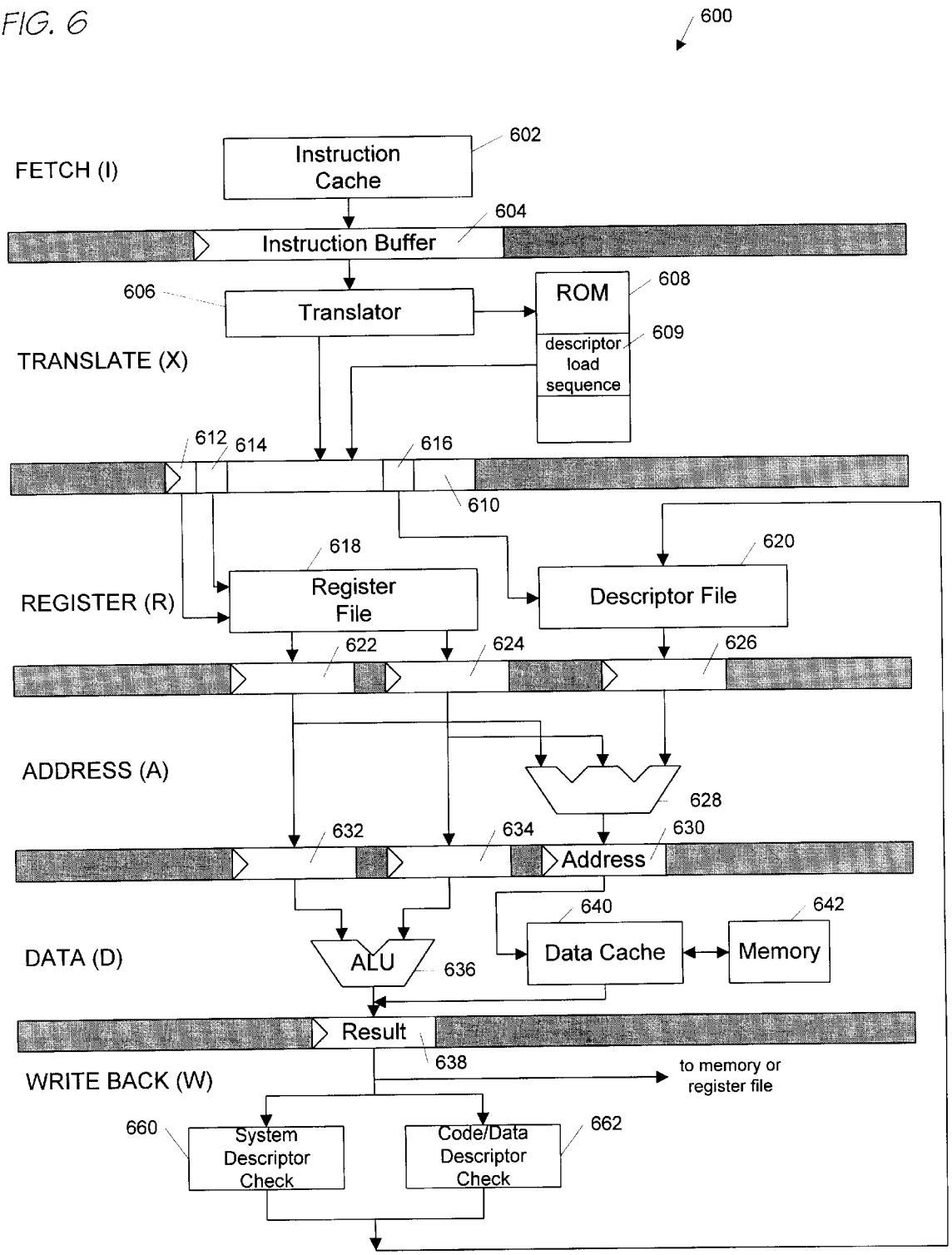
FIG. 6 is a block diagram of a portion of a pipeline processor which contains hardware validation logic for both system descriptors and code/data descriptors.

Now referring to FIG. 6, a block diagram of a pipeline processor 600 is shown. The pipeline processor 600 contains six processing stages through which instructions pass. The stages include: 1) Fetch; 2) Translate/Decode; 3) Register access; 4) Address calculation; 5) Data access/store/computation; and 6) Write Back. One skilled in the art will appreciate that these stages are illustrative only, and may be combined or altered by a designer.

The processor 600 includes an instruction cache 602 for storing macro instructions for execution. The instruction cache 602 provides the macro instructions to an instruction buffer 604 which temporarily stores the instructions before they are decoded by a translator 606. The translator 606 decodes each macro instruction into a sequence of micro instructions by addressing a micro instruction sequence within a control ROM 608 pertaining to each macro instruction. The control ROM 608 provides the addressed micro instruction sequence to an instruction register 610 for execution by the processor 600. Shown within the control ROM 608 is a descriptor load sequence 609. The descriptor load sequence 609 is a micro instruction sequence which instructs the processor 600 to load a segment register with a selector/descriptor from memory.

The instruction register 610 also contains operand locations 612, 614 which are used to designate operands applicable to a particular macro instruction. Operands are retrieved from a register file 618 and provided to temporary registers 622, 624 for use in later stages in the pipeline. In addition, a segment register may be defined for a macro instruction by specifying the segment register within a location 616. By specifying a segment register within location 616, a descriptor corresponding to the specified segment register may be retrieved from the descriptor file, and placed in a temporary register 626 to be used as part of an address calculation in a later stage in the pipeline.

The contents of the temporary registers 622, 624 and 626 are provided to an address stage within the pipeline processor. The address stage includes an ALU circuit 628 which is used to add the base address (from the descriptor temporary register 626) to an offset defined by temporary registers 622, 624. The result from the ALU 628 is provided to a temporary register 630 which is used to access a memory location in a data stage of the pipeline processor 600. Operands from temporary registers 622, 624 may also be provided to temporary registers 632, 634 for use in later pipeline stages.

In the data stage, the address in temporary register 630 is used to access a memory location in a data cache 640, or if not present in the data cache 640, to access a memory location in a memory 642. The result from the data access may be stored in a result register 638. In the alternative, an ALU 636 may be used to calculate a result based on the contents of temporary registers 632, 634. The contents of the result register 638 are written to the memory 642, the register file 618, or the descriptor file 620 upon completion of an instruction.

When a macro instruction requests a segment register to be loaded, the macro instruction is provided to the translator 606 via the instruction buffer 604. The translator 606 decodes the macro instruction and addresses the descriptor load sequence 609 from the control ROM 608 to be provided to the instruction register 610 for execution. The instruction sequence flows down through the pipeline until it reaches the data stage. At this point, the address of the descriptor has been calculated, and is stored in the address buffer 630. This address is used to retrieve the desired descriptor from the memory 642. The descriptor is retrieved from the memory 642, and is placed within the result register 638. However, prior to writing the retrieved descriptor into the descriptor file 620, the descriptor must be validated.

Below the result register are shown two validation blocks for descriptors. A system descriptor check block 660, and a code/data descriptor check block 662 are connected to the result register 638. Each block reads the contents of the result register 638, during a descriptor load operation, and performs a set a validation checks on the descriptor. If the descriptor passes the validation checks, the descriptor is written into the descriptor file 620. If the descriptor does not pass the validation checks, an exception is generated by either of the system descriptor check block 660 or the code/data descriptor check block 662.

Use of a system descriptor check block 660 and a code/data descriptor check block 662, to validate a descriptor, may adequately validate descriptors, but as explained above, requires costly additional circuitry for the processor 600, and may add significant delay in writing a code/data descriptor into the descriptor file 620.

Figure 7:
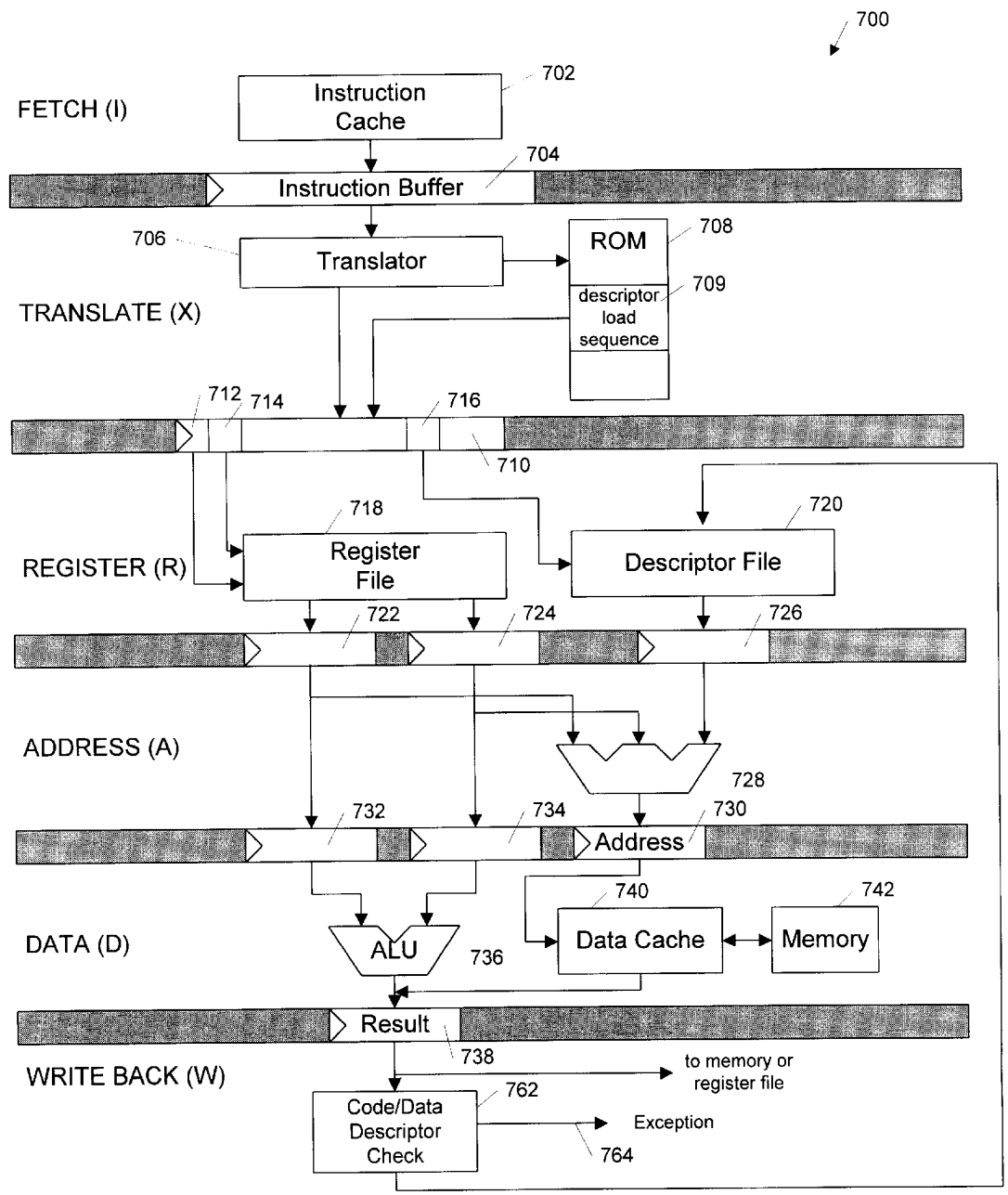
FIG. 7 is a block diagram of a portion of a pipeline processor, according to the present invention, which contains hardware validation logic for code/data descriptors.

Now referring to FIG. 7, a pipeline processor 700 is shown which is similar to that shown in FIG. 6. Like elements are indicated with like numbers, with the hundreds digit replaced by 7 instead of 6.

Missing from the pipeline processor 700 is a system descriptor check block 660. Rather, the processor 700 presumes that if a descriptor is being loaded, that the descriptor refers to a code or data segment. Therefore, only a code/data descriptor check block 762 is provided, connected to the result register 738. In instances where the descriptor being loaded is a code/data descriptor, the code/data descriptor block 762 validates the descriptor, and allows the descriptor to be written into the descriptor file 720.

If the descriptor which is being loaded is an invalid code/data descriptor, or if the descriptor is a system descriptor, the code/data descriptor check block 762 generates an exception on error line 764. This causes the processor 700 to jump to an exception handler sequence 711 which is stored within the control ROM 708.

The exception handler sequence 711 reads the contents of the result register 738 and determines whether the retrieved descriptor is invalid, or whether the retrieved descriptor is actually a system descriptor. If the retrieved descriptor is a system descriptor, validation checks on the descriptor are performed in software, rather than in hardware, by the exception handler 711. If the descriptor is valid, the exception handler 711 causes the contents of the result register 738 to be stored in the descriptor file 720. If, on the other hand, the descriptor is either not a system descriptor, or is an invalid system descriptor, an exception 764 is indicated, and the descriptor is not written into the descriptor file 720.

Figure 8:
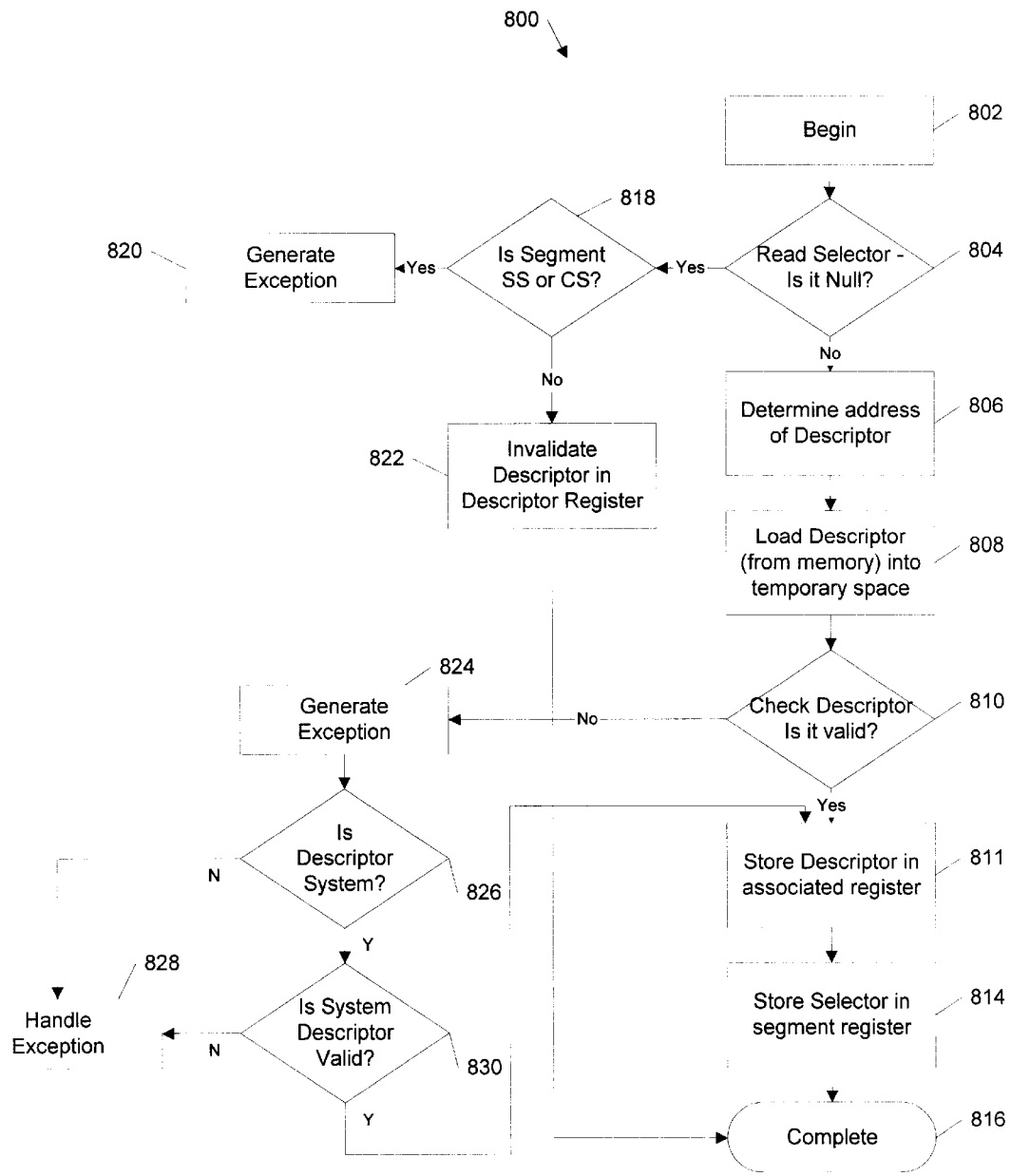
FIG. 8 is a flow chart illustrating a method of validating a descriptor, according to the present invention.

To better illustrate the process for validating a descriptor, according to the present invention, attention is directed to FIG. 8. A flow chart 800 is provided which begins at block 802. Program flow proceeds to block 804.

At block 804, a selector is read to determine whether it is null. If the selector is null, flow proceeds to block 818. If the selector is not null, flow proceeds to block 806.

At block 818, it is determined whether the selector is to be stored in the CS or SS register. If so, then an exception is generated at block 820. If not, then the descriptor is marked as invalid, and the load is complete, at block 816.

At block 806, the address of the descriptor is determined. Flow then proceeds to block 808.

At block 808, the descriptor is loaded from memory. This step corresponds to the data stage within the processor 700. The descriptor is read from the memory 742 and placed into the result register 738. Flow proceeds to decision block 810.

At decision block 810, the descriptor is checked to determine whether it is valid. This corresponds to the write back stage in the processor 700. More specifically, the descriptor is provided to the code/data descriptor check block 762 for validation. If the descriptor is a valid code/data descriptor, flow proceeds to block 811 where the descriptor is stored in the descriptor file 720, and the selector is stored in the register file 718, at block 814. At this point, the descriptor load operation is complete.

If, at block 810, the descriptor is found invalid by the code/data descriptor check block 762, then an exception is generated, in block 824, shown by line 764, causing the processor 700 to branch to an exception handler. Flow proceeds to decision block 826.

At decision block 826, the exception handler checks the descriptor to determine whether the descriptor is a system descriptor. If not, then the exception is handled, at block 828.

If the descriptor is a system descriptor, flow proceeds to block 830. Block 830 executes a sequence of instructions which validates the system descriptor. If the system descriptor is valid, program flow proceeds to block 811 where the descriptor is stored into the descriptor file 720. If the system descriptor is found invalid, the exception is handled, at block 828.

One skilled in the art will appreciate that the method for loading a descriptor, as illustrated by FIGS. 7 and 8, presumes that during a descriptor load operation, the descriptor which is being loaded refers to a code or data segment. In such instances, the code or data descriptor is validated by a hardware block 764, and if valid, is quickly stored in the descriptor file. If the descriptor is invalid, then an exception is generated which determines whether the segment is actually invalid, or whether it refers to a system segment. If the descriptor refers to a system segment, then validation checks are performed in software, rather than requiring a dedicated system descriptor validation circuit. If the descriptor is a valid system descriptor, the descriptor is stored into the descriptor file.

By presuming that a descriptor load is going to load a code or data segment, validation circuitry can be made very fast, and can therefore validate and store a code or data descriptor in a descriptor file much faster than if system validation checks are also performed. In addition, hardware typically associated with validating system descriptors has been eliminated.

In the case where a system segment is being loaded, the code/data validation checks indicate that the descriptor is invalid, which causes an exception. The exception handler then determines that the descriptor is in fact a system descriptor, and performs the validation checks in software.

Thus, if the majority of segment loads refer to code or data segments (which is the case in most operating environments), significant processing time is saved by not performing system descriptor validation checks during a descriptor load. This allows the descriptor to be stored, and subsequently used by a program much faster than if system validation checks are also performed. In the rarer case where a descriptor load operation refers to a system segment, the validation of the system descriptor is performed in software.

Although the present invention and its objects, features, and advantages have been described in detail, other embodiments are within the mind of the inventors. For example, it is anticipated that a test could be performed by the code/data validation block to determine whether the descriptor is a system descriptor, during the validation checks. If the test indicates that the descriptor is a system descriptor, a signal could be generated to the processor which indicates that system descriptor validation checks need to be performed. The signal could be used to branch to an exception routine, or could simply set a bit within the processor which caused a system descriptor validation sequence to be provided by a control ROM.

In fact, a check to determine whether a descriptor is a code/data descriptor, or a system descriptor, may be accomplished by a separate hardware circuit connected to the result register, which generates an exception, or otherwise notifies the processor that the descriptor being loaded refers to a system segment. Fast validation checking of code/data segments is a key feature of the present invention, while validation of system segments may be performed via software in an exception handler, software within a control ROM, or some other software/hardware arrangement.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for loading of a segment register within a processor, the method comprising the steps of:

a) loading a selector;

b) loading a descriptor corresponding to the selector;

c) performing segment validation checks on the descriptor utilizing a hardware validation circuit;

d) if the descriptor is valid, storing the descriptor and corresponding selector in the segment register within the processor;

e) if the descriptor is a system descriptor, branching to a software program that validates system descriptors;

f) if the system segment is valid, storing the descriptor in the segment register within the processor.

2. The method for loading of a segment register, as recited in claim 1, wherein the processor is an x86 compatible microprocessor.

3. The method for loading of a segment register, as recited in claim 1, wherein said step a) further comprises the steps of:

i) retrieving the selector and moving it into a temporary selector register;

ii) validating the selector.

4. The method for loading of a segment register, as recited in claim 3, wherein said step i) retrieves the selector from a register within the processor that is not a segment register.

5. The method for loading of a segment register, as recited in claim 3, wherein said step i) retrieves the selector from a memory.

6. The method for loading of a segment register, as recited in claim 3, wherein the temporary selector register holds the selector, prior to validation, and prior to writing the selector into the segment register.

7. The method for loading of a segment register, as recited in claim 1, wherein said step b) occurs after said step a).

8. The method for loading of a segment register, as recited in claim 1, wherein said step b) further comprises the steps of:

i) retrieving the descriptor from a memory location;

ii) storing the descriptor into a temporary descriptor register.

9. The method for loading of a segment register, as recited in claim 8, wherein the temporary descriptor register holds the descriptor prior to validation, and prior to writing the descriptor into the segment register.

10. The method for loading of a segment register, as recited in claim 1, wherein said step c) performs code segment validation checks.

11. The method for loading of a segment register, as recited in claim 1, wherein said step c) performs data segment validation checks.

12. The method for loading of a segment register, as recited in claim 1, wherein said step c) does not perform validation checks applicable only to system segments.

13. The method for loading of a segment register, as recited in claim 1, wherein the hardware validation circuit is a PLA circuit within the processor.

14. The method for loading of a segment register, as recited in claim 1, wherein the hardware validation circuit provides a signal to the processor to indicate whether the descriptor is valid.

15. The method for loading of a segment register, as recited in claim 14, wherein the hardware validation circuit provides a signal to the processor to indicate whether the descriptor is invalid.

16. The method for loading of a segment register, as recited in claim 15, wherein the hardware validation circuit provides a signal to the processor to indicate that the descriptor is invalid if the descriptor is a system descriptor.

17. The method for loading of a segment register, as recited in claim 1, wherein the hardware validation circuit tests the descriptor to determine whether it is a system descriptor.

18. The method for loading of a segment register, as recited in claim 17, wherein if the descriptor is a system descriptor, the hardware validation circuit provides an indicator to the processor indicating that a system descriptor is in the temporary descriptor register.

19. The method for loading of a segment register, as recited in claim 18, wherein if the hardware validation circuit provides an indicator to the processor indicating that a system descriptor is in the temporary register, said step e) occurs.

20. The method for loading of a segment register, as recited in claim 1, wherein said step e) further comprises:

i) generating an exception;

ii) jumping to an exception handler which contains the software program that validates system descriptors.

21. The method for loading of a segment register, as recited in claim 18, wherein said step e) further comprises:

i) recognizing the indicator;

ii) branching to the software program that validates system descriptors.

22. The method for loading of a segment register, as recited in claim 1, wherein the software program is stored within a control ROM within the processor.

23. The method for loading of a segment register, as recited in claim 1, wherein the indicator provided by the hardware validation circuit is a set bit within a control register.

24. A method for loading a segment register within a processor, the processor having hardware validation for code and data segments, and software validation for system segments, the method comprising the steps of:

a) retrieving a selector, and storing the selector in a temporary register;

b) validating the selector;

c) if the selector is valid, retrieving a corresponding descriptor and storing the descriptor into a temporary register;

d) providing the stored descriptor to a hardware validation circuit;

e) if the hardware validation circuit indicates that the stored descriptor is valid, storing the selector and descriptor into the segment register;

f) if the hardware validation circuit indicates that the stored descriptor is not valid, branching to a software program which validates system descriptors;

g) if the software program determines that the stored descriptor is a valid system descriptor, storing the selector and descriptor into the segment register.

25. The method for loading a segment register, as recited in claim 24, wherein said step b) further comprises the step of determining whether the selector is null.

26. The method for loading a segment register, as recited in claim 24, wherein the temporary register is connected to the hardware validation circuit.

27. The method for loading a segment register, as recited in claim 24, wherein the hardware validation circuit indicates that the stored descriptor is valid by providing a signal to the processor.

28. The method for loading a segment register, as recited in claim 24, wherein said step e) further comprises the step of indicating to the processor, by the hardware validation circuit, that the stored descriptor is not a valid code or data descriptor.

29. The method for loading a segment register, as recited in claim 28, wherein said step of indicating comprises providing a signal to the processor that the stored descriptor is invalid.

30. The method for loading a segment register, as recited in claim 28, wherein said step of indicating comprises providing a signal to the processor that the stored descriptor is a system descriptor.

31. The method for loading a segment register, as recited in claim 28, wherein said step of indicating comprises setting a bit in the processor indicating that the stored descriptor is invalid.

32. The method for loading a segment register, as recited in claim 24, wherein the software program resides within a control ROM within the processor.

33. The method for loading a segment register, as recited in claim 24, wherein the software program is part of an exception handler within the processor.

34. A method for loading a segment register, within a processor having hardware validation checks for code and data descriptors, and software validation checks for system descriptors, the method comprising the steps of:

a) retrieving a selector;

b) validating the selector;

c) if the selector is valid, retrieving a descriptor corresponding to the selector;

d) providing the descriptor to a hardware validation circuit which validates code and data descriptors;

e) if the hardware validation circuit determines that the descriptor is a valid code or data descriptor, storing the selector and descriptor into the segment register;

f) if the hardware validation circuit determines that the descriptor is not a valid code or data descriptor, branching to a software program which validates system descriptors;

g) if the software program determines that the descriptor is a valid system descriptor, storing the selector and descriptor into the segment register;

h) wherein said step d) does not perform validation checks applicable only to system descriptors.

* * * * *